US009965155B2

(12) United States Patent
Keysers et al.

(10) Patent No.: US 9,965,155 B2
(45) Date of Patent: May 8, 2018

(54) DYNAMICALLY MERGING MULTIPLE SCREENS INTO ONE VIEW PORT

(71) Applicant: Google LLC, Mountain View, CA (US)

(72) Inventors: Daniel M. Keysers, Stallikon (CH); Thomas Deselaers, Zurcich (CH); Victor Carbune, Zurich (CH)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 14/671,789

(22) Filed: Mar. 27, 2015

(65) Prior Publication Data
US 2016/0283084 A1  Sep. 29, 2016

(51) Int. Cl.
*G06F 3/0484* (2013.01)
*H04W 4/00* (2009.01)
*H04L 29/08* (2006.01)
*G06F 3/14* (2006.01)
*G01S 5/00* (2006.01)
*G06F 3/01* (2006.01)
*G06F 3/0481* (2013.01)
(Continued)

(52) U.S. Cl.
CPC .......... *G06F 3/04842* (2013.01); *G06F 3/017* (2013.01); *G06F 3/0481* (2013.01); *G06F 3/04883* (2013.01); *H04L 67/18* (2013.01); *H04M 1/7253* (2013.01); *H04W 4/008* (2013.01); *G01S 5/0072* (2013.01); *G06F 3/1423* (2013.01); *H04M 2250/16* (2013.01); *H04M 2250/22* (2013.01)

(58) Field of Classification Search
CPC .. G06F 3/1423; G06F 3/0484; G06F 3/04883; G06F 3/1438; G06F 3/1446; G06F 3/038; G06F 9/4443; G06F 3/04842; G06F 3/0481
See application file for complete search history.

(56) References Cited

U.S. PATENT DOCUMENTS 5,390,279 A    2/1995  Strong
6,904,405 B2   6/2005  Suominen
(Continued)

FOREIGN PATENT DOCUMENTS

EP    2675144    12/2013

OTHER PUBLICATIONS

International Search Report and Written Opinion in International Application No. PCT/US2016/015607, dated May 10, 2016, 13 pages.
(Continued)

*Primary Examiner* — Kieu Vu
*Assistant Examiner* — Blaine T. Basom
(74) *Attorney, Agent, or Firm* — Fish & Richardson P.C.

(57) ABSTRACT

Methods, systems, and apparatus, including computer programs encoded on a computer storage medium, for performing dynamic, stroke-based alignment of touch displays. In one aspect, a method include providing, for output by a first mobile computing device that (i) has a first proximity sensitive display and (ii) has been designated a primary display device, a primary alignment user interface. The methods also includes transmitting, by the first mobile computing device to a second mobile computing device that (i) has a second proximity sensitive display and (ii) has been designated a secondary display device, an instruction to output a secondary alignment user interface.

20 Claims, 8 Drawing Sheets

(51) Int. Cl.
*H04M 1/725* (2006.01)
*G06F 3/0488* (2013.01)

(56) References Cited

U.S. PATENT DOCUMENTS

| | | | |
|---|---|---|---|
| 8,823,640 B1* | 9/2014 | Harris | G06F 3/1438 |
| | | | 345/156 |
| 9,224,358 B2* | 12/2015 | Drake | H04B 5/02 |
| 2005/0093868 A1* | 5/2005 | Hinckley | G06F 3/011 |
| | | | 345/502 |
| 2005/0137868 A1 | 6/2005 | Epstein | |
| 2007/0124503 A1* | 5/2007 | Ramos | G06F 3/017 |
| | | | 709/248 |
| 2008/0030425 A1* | 2/2008 | Fullerton | G06F 3/1423 |
| | | | 345/1.1 |
| 2012/0242596 A1* | 9/2012 | Sip | G06F 3/04883 |
| | | | 345/173 |
| 2013/0169571 A1 | 7/2013 | Gai et al. | |
| 2013/0314302 A1* | 11/2013 | Jeung | G06F 3/1454 |
| | | | 345/2.3 |
| 2013/0321310 A1* | 12/2013 | Yen | G06F 3/0412 |
| | | | 345/173 |
| 2013/0346077 A1 | 12/2013 | Mengibar | |
| 2014/0002327 A1* | 1/2014 | Toren | G06F 3/1423 |
| | | | 345/1.1 |
| 2014/0223330 A1 | 8/2014 | Wang et al. | |
| 2015/0042559 A1* | 2/2015 | Li | G06F 3/1438 |
| | | | 345/156 |
| 2016/0054973 A1 | 2/2016 | Gai et al. | |

OTHER PUBLICATIONS

International Preliminary Report on Patentability in International Application No. PCT/US2016/015607, dated Oct. 12, 2016, 9 pages.

* cited by examiner

DYNAMICALLY MERGING MULTIPLE SCREENS INTO ONE VIEW PORT

FIELD

The present specification relates to computer screens, and one particular implementation relates to dynamically aligning multiple touch displays.

BACKGROUND

Mobile devices, such as smart phones, personal digital assistants (PDAs), and tablet computers, typically include a touch display through which a user can provide input, and through which the mobile device can display information to the user. In many circumstances, multiple mobile devices may be available to a user at the same time, making the use of multiple touch displays for input and output possible.

SUMMARY

In general, one innovative aspect of the subject matter described in this specification can be embodied in processes that dynamically configures two or more displays of distinct devices to show a single viewport based on an association between the devices. This process may also align multiple displays of different sizes, aspect ratios, or resolutions using a transform between the displays to enable the displays to behave as a single larger display. The process may also allow a user to add or remove configured displays from the single viewport.

In general, one innovative aspect of the subject matter described in this specification can be embodied in the methods that include determining that a first mobile computing device is associated with a second mobile computing device; automatically determining positional information of the first mobile computing device in relation to the second mobile computing device, based at least on determining that the first mobile computing device is associated with the second mobile computing device; in response to determining positional information of the first mobile computing device in relation to the second mobile computing device, generating a transform between a first proximity sensitive display of the first mobile computing device and a second proximity sensitive display of the second mobile computing device; and using the transform to dynamically merge the viewports of the first proximity sensitive display and the second proximity sensitive display.

These and other implementations may each optionally include one or more of the following features. For instance, providing, for output by a first mobile computing device that (i) has a first proximity sensitive display and (ii) has been designated a primary display device, a primary alignment user interface. The methods also includes transmitting, by the first mobile computing device to a second mobile computing device that (i) has a second proximity sensitive display and (ii) has been designated a secondary display device, an instruction to output a secondary alignment user interface. The methods also includes receiving, by the first mobile computing device, (i) data indicative of one or more stroke segments input through the primary alignment user interface that is output on the first proximity sensitive display of the first mobile computing device, and, (ii) from the second mobile computing device, data indicative of one or more stroke segments input through the secondary alignment user interface that is output on the second proximity sensitive display of the second mobile computing device.

The methods also includes determining, based at least on the display alignment parameters for the second proximity sensitive display, a transform for the second proximity sensitive display, and using the transform for the second proximity sensitive display to process (i) a subsequently received input received through the second proximity sensitive display, or (ii) a subsequent output for display on the second proximity sensitive display.

In additional implementations, the alignment parameters include (i) a horizontal offset in relation to a reference point on the primary display device, (ii) a vertical offset in relation to a reference point on the primary display device, (iii) an angular offset in relation to an axis associated with the primary display device, (iv) a global positional reference, and (v) a difference in scale; obtaining, by the first mobile computing device, data that characterizes the first mobile computing device, receiving, by the first mobile computing device, data that characterizes the second mobile computing device, and based at least on the (i) data that characterizes the first mobile computing device, and (ii) the data that characterizes the second mobile computing device, designates the first mobile computing device as the primary display device. The methods include establishing a direct connection between the first mobile computing device and the second mobile computing device; providing, for output on the primary alignment user interface, an indication that the transform has been generated; determining that the offset of the second proximity sensitive display in relation to the first proximity sensitive display has likely changed includes receiving, by the first mobile computing device, motion data from (i) a motion sensor of the first mobile computing device or (ii) the second mobile computing device, and comparing the motion data to one or more thresholds.

In additional implementations, the transform may include a look-up table, function, or a mathematical expression that maps display coordinates of the second proximity sensitive display to display coordinates in a coordinate system associated with the first proximity sensitive display.

In some implementations, using the transform for the second proximity sensitive display includes receiving, by the first mobile computing device and from the second mobile computing device, data indicative of the subsequently received input received through the second proximity sensitive display; applying, by the first mobile computing device, the data indicative of the subsequently received input to the transform to generate a transformed input; providing the transformed input to an application executing on the first mobile computing device; receiving, by the first mobile computing device, data indicative of the subsequent output from an application executing on the first mobile computing device; receiving, by the first mobile computing device, data indicative of the subsequent output from an application executing on the first mobile computing device; receiving, by the first mobile computing device, data indicative of the subsequent output from an application executing on the first mobile computing device; providing, by the first mobile computing device, the transformed output to the second mobile computing device.

In some implementations, after using the transform for the second proximity sensitive display, determining that the offset of the second proximity sensitive display in relation to the first proximity sensitive display has likely changed; in response to determining that the offset of the second proximity sensitive display in relation to the first proximity sensitive display has likely changed, providing, for output by the first mobile computing device, the primary alignment user interface; transmitting, by the first mobile computing device to the second mobile computing device, a second instruction to output the secondary alignment user interface; receiving, by the first mobile computing device, (i) data indicative of one or more additional stroke segments input through the primary alignment user interface that is output on the first proximity sensitive display of the first mobile computing device, and, (ii) from the second mobile computing device, data indicative of one or more additional stroke segments input through the secondary alignment user interface that is output on the second proximity sensitive display of the second mobile computing device; determining, based at least on the (i) data indicative of the one or more additional stroke segments input through the primary alignment user interface, and, (ii) data, received from the second mobile computing device, indicative of the one or more additional stroke segments input through the secondary alignment user interface, one or more subsequent display alignment parameters for the second proximity sensitive display; determining, based at least on the subsequent display alignment parameters for the second proximity sensitive display, a second transform for the second proximity sensitive display; using the second transform for the second proximity sensitive display to process (i) a further received input received through the second proximity sensitive display, or (ii) a further output for display on the second proximity sensitive display.

In other implementations, providing, for output on the primary alignment user interface, an indication for a user of the first mobile computing device and the second mobile computing device to: (i) align the first mobile computing device and the second mobile computing device as they are to be used, and (ii) input, through the primary alignment user interface and the secondary alignment user interface, at least one continuous stroke that spans the primary alignment user interface and the second primary alignment user interface. Additionally, display alignment parameters are determined further based on (iii) a slope of one or more of the stroke segments input through the primary alignment user interface or the secondary alignment user interface, (iv) an identifier of a user of the first mobile computing device or the second mobile computing device, (v) timing information relating to input of one or more of the stroke segments input through the primary alignment user interface or the secondary alignment user interface, (vi) model information of the first mobile computing device or the second mobile computing device, or (vii) one or more characteristics of the first proximity sensitive display or the second proximity sensitive display.

In another implementation, a process for dynamically configuring two or more displays includes using two or more touch displays. The process may be based on the receipt of a touch input having segments that occur on each device. The process of aligning displays is initiated by placing the devices in close proximity, which initiates an automated communication between the devices that designates one device as the primary device. The user is then instructed to provide an input pattern across the touch displays of the devices to determine the alignment between multiple devices. The alignment process automatically occurs on the primary device, where a transform between the touch displays is computed based on the display coordinates of the user's touch stroke segments on both touch displays. The stroke segments are used to determine the parameters, such as the horizontal offset, vertical offset and angular displacement between devices, which are used to dynamically combine the two display views into one view port.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1A:
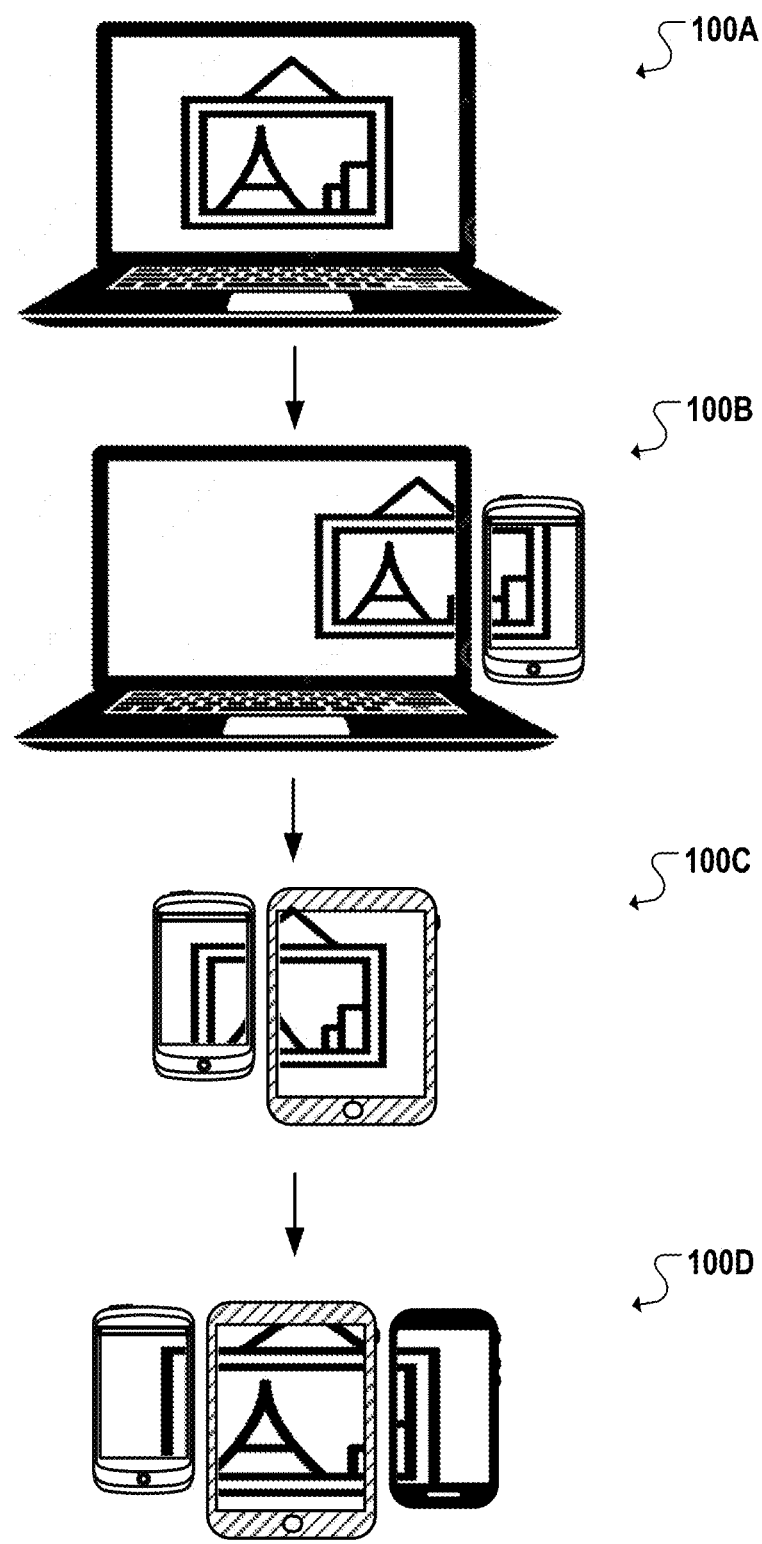
FIG. 1A illustrates an example process for dynamically configuring multiple displays.

FIG. 1A illustrates an example process for dynamically configure multiple screens. Briefly, process 100A illustrates a graphical display on a viewport on a first device, process 100B illustrates merging the viewport on the first device with a second device, process 100C illustrates removing the first device from viewport and adding a third device, process 100D illustrates the addition of a fourth device to the merged viewport. Although the devices in FIG. 1A include a laptop, two smartphones and a tablet, other types of mobile computing devices may also form associations with the devices represented in FIG. 1A.

Initially, the viewport in process 100A includes a first device as represented in FIG. 1A. The first device may form an association with a second device in process 100B, which enables the configuration of a single viewport that displays the graphic on the first device. The dynamic viewport may be maintained on the second device even after removing the association with the first device. The second device may then form a subsequent association with a third device and continue to maintain the dynamic viewport that displays the graphic, as represented in process 100C. The third device may then form an association with a fourth device, which configures the fourth device to also display the graphic on the dynamic view port.

Figure 1B:
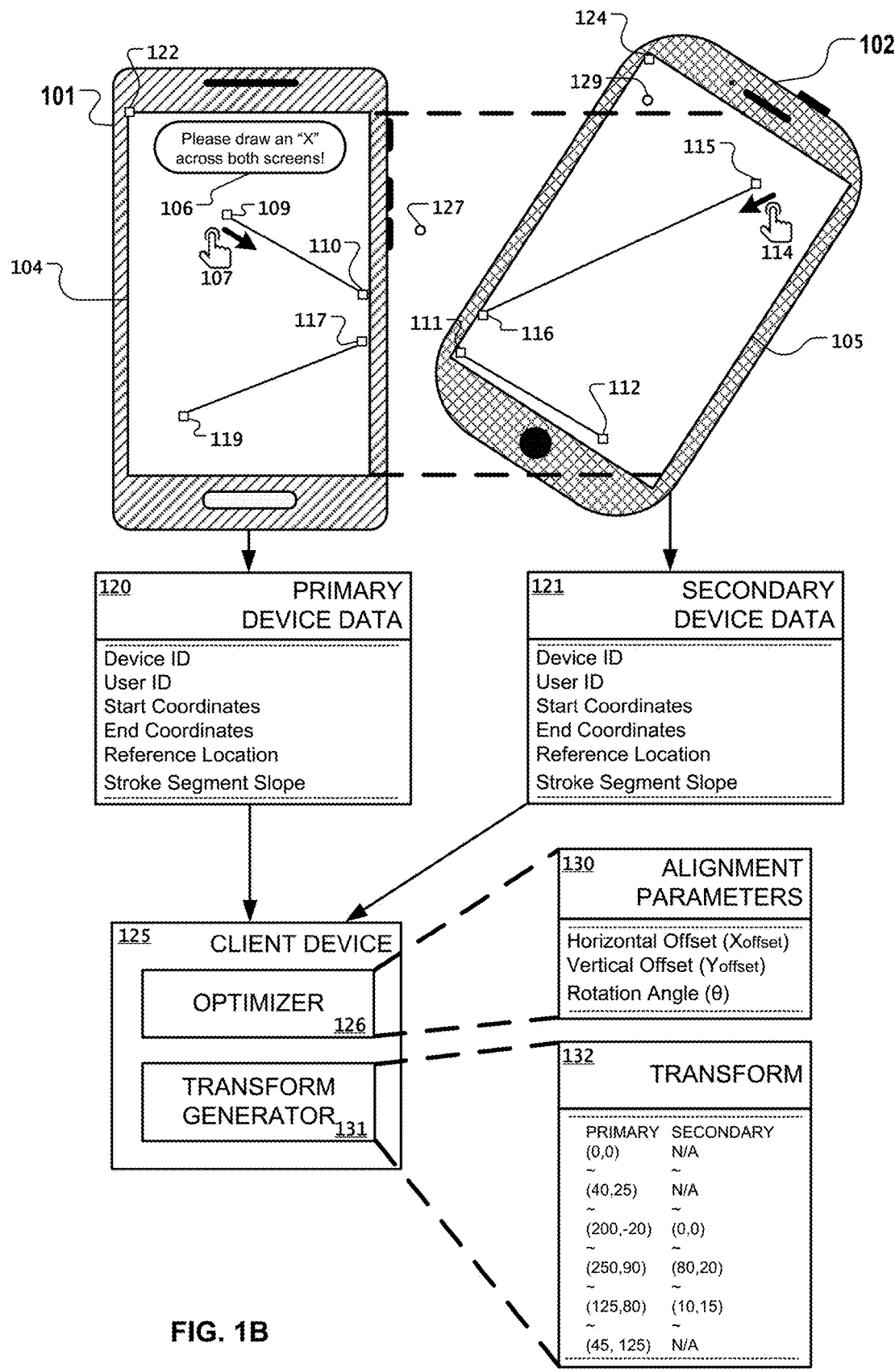
FIG. 1B illustrates an example alignment of two devices based on an input of one or more strokes.

FIG. 1B illustrates an example alignment of two devices based on an input of one or more strokes. Primary device 101 and secondary device 102 include touch display 104 and touch display 105, respectively, which detect the presence of a touch input within the display area of the touch displays. Although FIG. 1 only illustrates two devices, in some implementations, there may be two or more secondary devices that are used with primary device 101.

Primary device 101 and secondary device 102 may be any type of mobile computing device with a touch display, such as a smartphone, tablet computer, laptop computer. In one implementation, primary device 101 and secondary device 102 may be different categories of mobile computing devices, such as a smartphone and a laptop computer. In another implementation, primary device 101 and secondary device 102 may be running different operating systems such as a mobile operating system for smartphones a desktop operating system for laptop computers, or different mobile operating systems based on the device manufacturer.

In one particular implementation, primary device 101 and secondary device 102 may be designated as the primary device and the secondary device through a specific designation process that identifies the primary device as the controller that performs all processes necessary for alignment, and the secondary device as the receiver that transmits user input to the primary device. In other implementations, the designation process of devices between primary device 101 and secondary device 102 may consist of a peer-to-peer communication that identifies all devices are primary devices as controllers for performing specific processes. In this implementation, the alignment processes may be performed in a segmented manner to maximize processing speed. For example, primary device 101 and secondary device 102 may be designated as peer devices where the optimization of received input may be performed on secondary device 101 while the transform process is performed on the primary device 101.

As used by this specification, a "touch display" (or "touch screen," or "touch sensitive display," or "proximity sensitive display") is an electronic visual display that can detect the presence and location of a touch within the display area. The touch defines a user input that can represent a single input at any particular location on touch display 104 and touch display 105, or the touch can represent a movement, or "stroke segment", across multiple locations on primary touch display 104 and secondary touch display 105, respectively. In other implementations, a proximity sensitive display may be used in place of a touch display.

Primary touch display 104 or secondary touch display 105 may be capacitive displays that receive conductive signals for input. In some implementations, primary touch display 104 or secondary touch display 105 may also be digitized touch displays that receive input through an active digitizer stylus as well as through a capacitive touch. Primary touch display 104 and secondary touch display 105 need not be the same type of touch display to be used as discussed within this specification.

The user may provide touch input to primary touch display 104 and secondary touch display 105 to control the application in response to an on-screen instruction 106 on primary touch display 104. A user may provide input either directly through a finger touch or through any other device such as a stylus that is capable of being detected by either touch display.

In some implementations, on-screen instruction 106 (in the figure, "Please draw an "X" across all screens!") may be presented through the operating system of primary device 101. For example, the instruction may be presented as a notification on the home screen of the operating system. In other implementations, on-screen instruction 106 may be presented through an application within the operating system of primary device 101. For example, the on-screen instruction may be presented from a mobile application executing on a smart-phone after the user has entered the application. The on-screen instruction may also be presented in different contexts such as a text message stating an action or a picture representing an action to the user.

On-screen instruction 106 may direct the user to provide a touch gesture 107 including a continuous stroke from any location on primary touch display 104 to any location on secondary touch display 105. The user may, for example, provide a stroke segment from touch point 109 to the boundary point 110 of primary device 101 and continue to the boundary point 111 of secondary device 102 and continue to touch point 112 of secondary device 102. The user may then input a subsequent stroke segment using touch gesture 114 from touch point 115 to the boundary point 116 and continue to the boundary point 117 on primary device 101 and continue to the touch point of 119 on primary device 101. The stroke segment input may be performed between primary display 104 and secondary display 105 from any direction from the surface of the display screens. Although only two stroke segment inputs are represented in FIG. 1B, a user may provide any number of stroke segments between primary display 104 and secondary display 105.

Figure 3A:
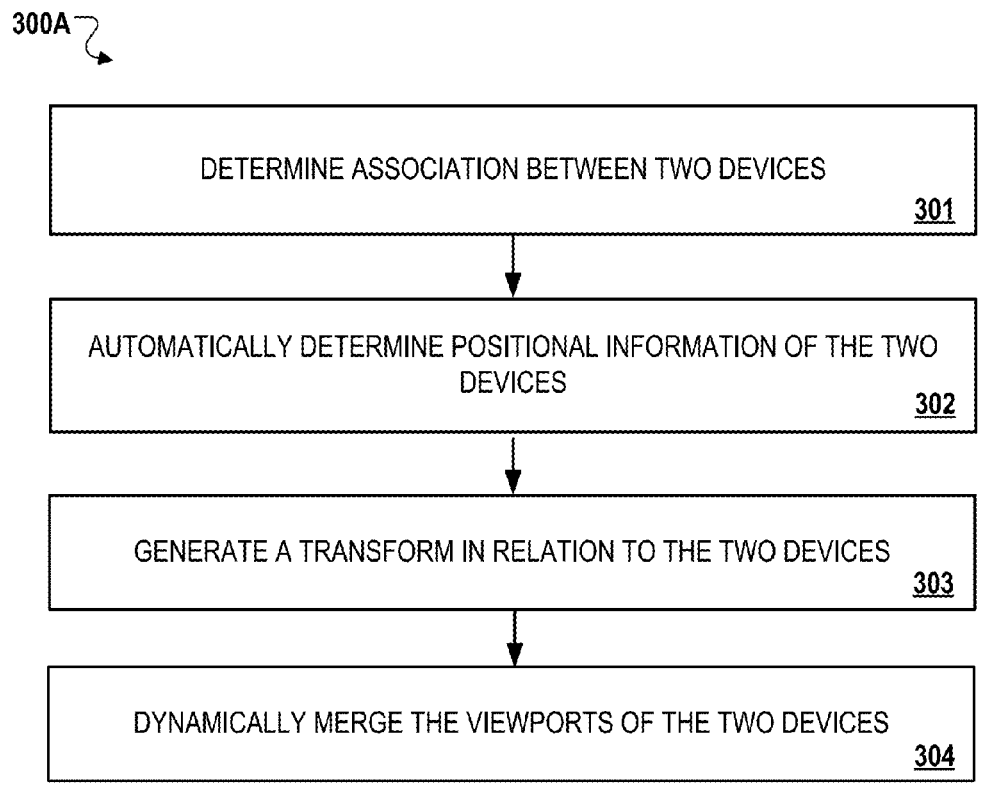
FIG. 3A is a flow chart illustrating an example process for dynamically configuring multiple displays.
Figure 3B:
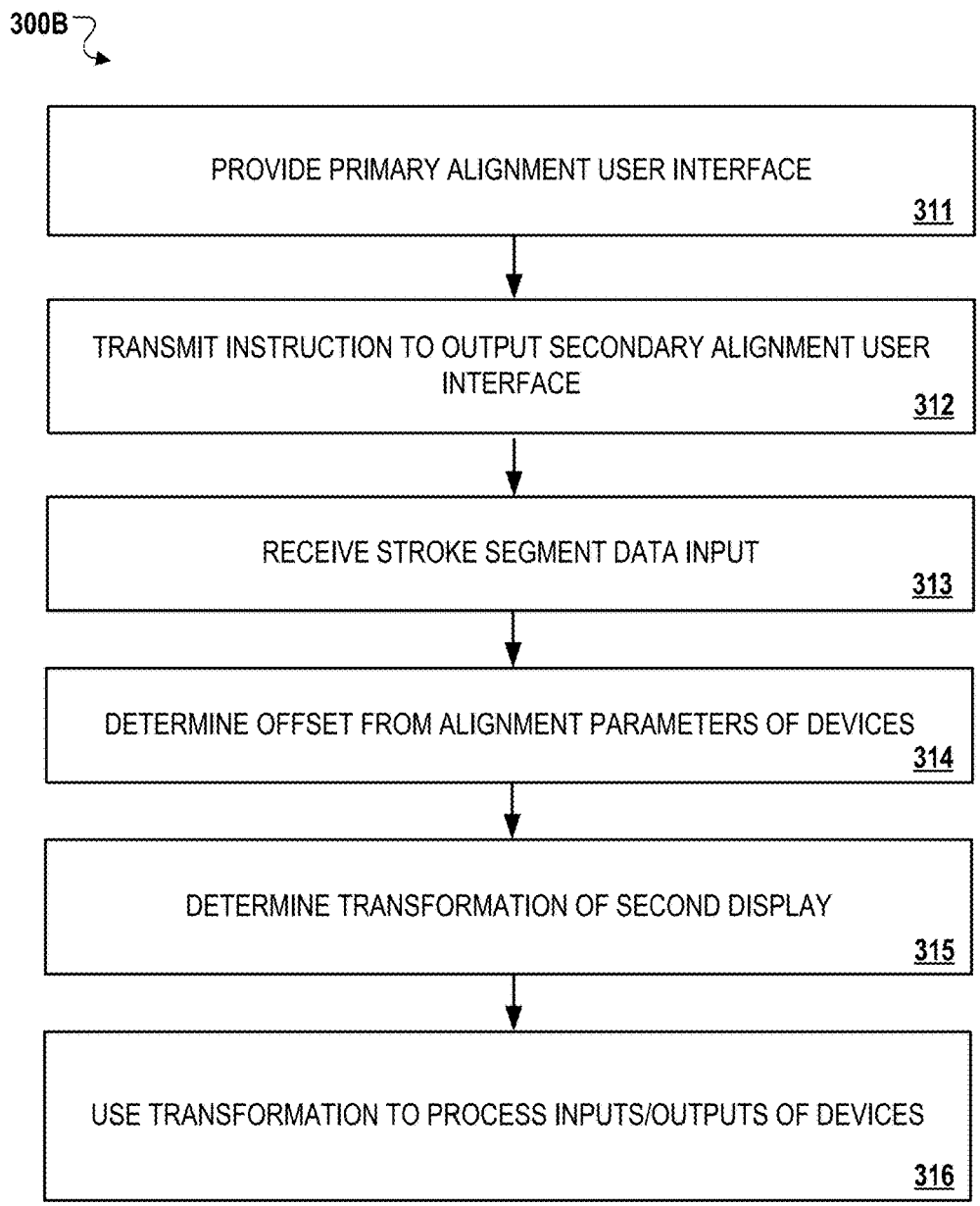
FIG. 3B is a flow chart illustrating an example process for aligning screens of multiple touch displays.

Stroke segment inputs from touch point 109 to touch point 112 and from touch point 115 to touch point 119, respectively, are used to generate representative primary device data 120 and representative secondary device data 121 of primary device 101 and secondary device 102 through a primary alignment user interface as discussed in FIG. 3B. Representative data that may be stored on primary device 101 or secondary device 102 includes, but is not limited to, a device identifier (ID), a user ID or profile information, periodicity data for the segments, touch display coordinates for primary reference point 122, a secondary reference point 124, touch display coordinates for touch points 109, 110, 112, and 15, touch display coordinates for boundary points 110, 111, 116 and 117, slopes of stroke segments between touch point 109 and boundary point 110, boundary point 111 and touch point 112, between touch point 119 and boundary point 117, and between boundary point 116 and touch point 115. In some implementations, a number of data items within primary device data 120 may not be identical to secondary device data 121.

User stroke segment input is stored as primary device data 120 and secondary device data 121, which includes specific data from primary device 101 and secondary device 102 such device ID, user ID, start coordinates, end coordinates, reference location, and stroke segment slope. Data from touch input is transmitted to client device 125 to initiate the optimization and transform procedures.

In one implementation, client device 125 includes an optimizer 125 that uses primary device data 120 and secondary device data 121, generated from user stroke segment input, to calculate a set of alignment parameters 130, such as horizontal offset, vertical offset and rotation angle, which represent a relationship between stroke segments on primary display 104 and secondary display 105. In one implementation, for example, the alignment parameters 130 may represent the coordinates of the user stroke segment input and a pixel mapping between the two screens onto a common coordinate axis, including vertical and horizontal displacement from reference coordinate 122.

In another implementation, alignment parameters 130 may include timing information of the user stroke segment input such as time lapse from boundary point 110 and boundary point 111 to calculate the distance between primary touch display 104 and secondary touch display 105. For example, if a user provided a stroke segment input from a smartphone touch display to a secondary device that was a larger tablet computer, optimizer 126 may calculate the velocity profiles of the individual stroke segments using the displacement between coordinates and time lapse between touch inputs to determine the displacement between boundary touch points of both devices.

In another implementation, alignment parameters 130 may include a combination of geographical and time information of user stroke segment input to reestablish a connection between primary touch display 104 and secondary touch display 105. For example, if primary device 101 and secondary device 102 are disconnected throughout the alignment process, then optimizer 126 may use alignment parameters such as horizontal and vertical offsets, slopes of input stroke segments and time lapse between touch input coordinates to predict the probable location of secondary device 102 when reestablishing the network connection between devices. Alignment parameters 130 calculated by optimizer 126 are transmitted to transform generator 131 that determines the transform 132 for the secondary touch display 105 in relation to the primary touch display 104. In one implementation, the transform may be a look-up table that includes pixel coordinates of user stroke segment input on primary touch display 104 such as touch points 109 and 119 and pixel coordinates of user stroke segment input on secondary touch display 105 such as touch points 112 and 114.

In another implementation, the look-up table may also represent a conversion of the pixel locations from the secondary touch display 105 to the reference pixel coordinate locations on primary touch display 104. For example, touch point 109 may have coordinate pixel location of (40, 25) within primary touch display 104, which measures 100 pixels horizontally and 150 pixels vertically, but no coordinate pixel locations within the secondary touch display since it is outside the addressable boundaries of the secondary touch display 105. The secondary coordinate pixel location for touch point 109 may therefore be represented as 'N/A,' or as no value or a NULL value, within the lookup table. In another example, touch point 112 may have coordinate pixel location of (80, 20) within secondary touch display 105, which measures 100 pixels horizontally and 150 pixels vertically, but have a coordinate pixel location of (250, 90) in the primary touch display since its coordinate system is addressable beyond the boundaries of the touch display. Another example may be point 127, which is not within the boundaries of secondary touch display but has a primary coordinate pixel location of (45, 125). Another example may be touch point 129, which may have a secondary coordinate pixel location of (10, 15) and a primary coordinate pixel location of (215, −5) since its horizontal coordinate is beyond the horizontal boundary of primary touch display 104.

In other implementations, the transform may vary for multiple secondary devices that share stroke segment inputs with primary device 101. For example, if there are two smartphones that share inputs with one tablet computer that acts as primary device 101, then there may be two different transforms calculated by transform generator 131 specific to the touch displays of each secondary device.

In some implementations, the transform may be used to map a common view port between primary device 101 and other secondary devices using the touch pixel coordinates inputted by the users on the touch displays. For example, primary touch display 104 may show one aspect of a visual representation on the screen whereas touch display 105 may show an alternative aspect of a visual representation on the screen. In other implementations, the transform of primary device 101 and secondary device 102 may be used to form a continuous view port of touch display 104 for increased display sizes. For example, a user may use secondary touch display 105 as an extended display of primary touch display 104 by dragging objects displayed on primary touch display 104 into secondary touch display 105.

In other implementations, the transform may be used to coordinate user activities or computing processes on primary device 101 and secondary device 102 that are communicated to the user using the device's touch displays. Further, the transform between primary display 104 and secondary display 105 may be used to determine optimal location of the touch displays based on the stroke segment input supplied by the user in different setup configurations. For example, a user may wish to place the multiple displays perpendicular to one another, and use different touch configurations to generate multiple transforms to determine the optimal placement of secondary display 105 in relation to primary display 104.

In other implementations, the transform may be used to detect time-dependent inputs between multiple devices and create a set of instructions or commands between devices. For example, a user may use the transform to track input provided on primary device 101 to execute a command on secondary device 102 after a specified time delay between the input on touch display 104 and output sent to secondary touch display 105. Another example may include using the transform to detect a specified input to output a set of actions such as running an application, configuring the device and/or turning features of the operating system on or off.

In other implementations, the transform may be used as an input/output threshold to specify or direct different sets of actions on secondary devices based on the characteristics of the input provided on primary touch display 104. For example, the transform may be used to generate a pixel map where only certain locations within the primary display 104 trigger output actions to secondary device 102. A user may direct the primary device 101 to carry out a different set of procedures or actions based on the location of the input provided on the primary touch display 104.

Figure 1C:
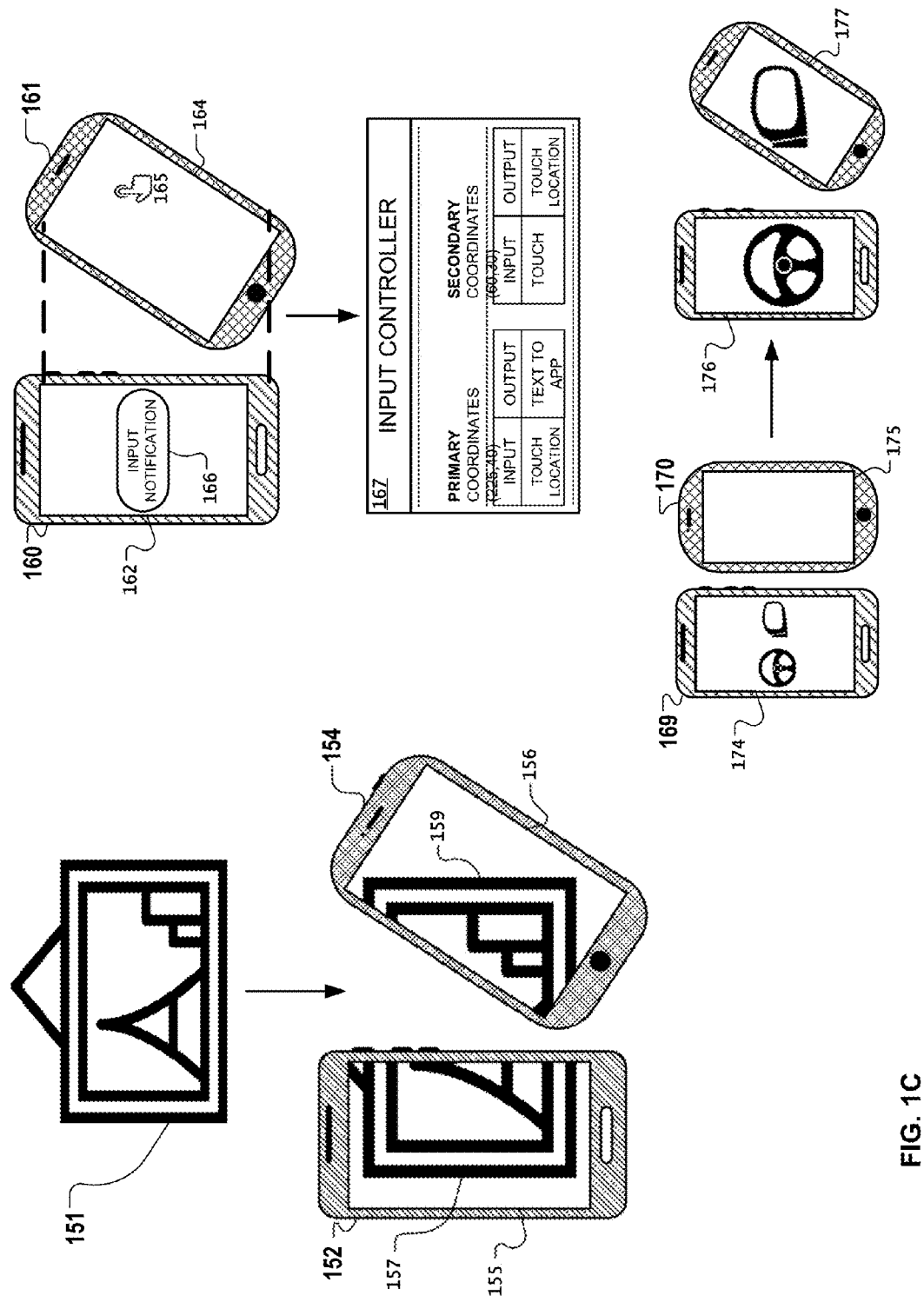
FIG. 1C illustrates three example alignments between multiple displays.

FIG. 1C illustrates three example alignments between multiple displays. In the first example, after a successful alignment between primary device 152 and secondary device 154, a graphical representation 151 may be represented across a common view port including primary touch display 155 and secondary touch display 156. Graphical segment 157 is the portion of the graphical representation 151 that is displayed within the physically addressable pixel coordinate region of primary touch display 155 and graphical segment 159 is the portion of the graphical representation 151 that is displayed within the physically addressable pixel coordinate region of secondary touch display 156. For example, graphical representation 151 may be a picture file that a user may wish to represent over multiple touch displays. In such an example, the alignment of the touch displays of two smart phones may allow the display of the picture file through a single viewport including the addressable pixel coordinate regions of each touch display.

In the second example, the alignment between multiple displays may be represented through a coupled touch input 165 on the secondary touch display 164 and an input notification 166 displayed on the primary touch display 162. Touch input 165 and input notification 166 are processed as respective inputs and outputs for primary device 160 and secondary device 161 through the input controller 167, which receives characteristic data 169 from each device such as pixel coordinate locations of the touch input or a repository of previous input/output commands based on the input action provided by the user on each touch display. For example, when a user provides a touch input on the touch display of the secondary device, the input controller 167 may store the pixel coordinate locations of the touch input of the secondary touch display and use the generated transform between the displays to determine the corresponding pixel coordinate locations on the primary touch display.

Input controller 167 may also associate the input provided on the secondary touch display 164 with a prior output action performed in response to receiving such input, and transmit a subsequent input instruction to the operating system of primary device 160. For example, in response to a touch gesture on the secondary display, the input controller 167 may transmit an instruction to the primary display to output a text message to a mobile application located on primary device. In some implementations, the input controller may also process the initial input that triggers the subsequent output instruction from the primary device 160 from an input provided on the primary touch display 162.

The third example demonstrates how a transform may be utilized to align displays of multiple devices to view an input video shown on one device onto multiple devices that share a single view port. As demonstrated in the figure, the user may play a driving game on primary device 169 with video of a steering wheel with concurrent view of a side-view mirror on primary touch display 174. A user may wish to output one of the views of the game to secondary touch display 175 by using a generated transform between primary touch display 174 and secondary touch display 175 that represents an alignment between the two displays. Subsequently, the primary touch display 176 may display one view of the game such as the steering wheel, and the secondary touch display 177 may display another view of the game such as a side-view mirror.

A user may subsequently alter the alignment of one or more of the devices relative to each other and utilize the transform to maintain the single view port. For example, a user may initially align primary device 169 and secondary device 170 horizontally and then subsequently tilt the secondary device 170 relative to primary device 169. In the newly configured position, primary touch display 176 displays the same video as in its previously configured position since there is no rotation of its pixel coordinate system to the pixel coordinate system of primary touch display 174 in its original position. Although secondary touch display 177 is rotated in relation to the previously configured position of secondary display 175, the video displayed is oriented to the primary touch display 176 by applying a transform between the new pixel coordinate system of secondary touch display 177 and the primary touch display 176 to maintain the single view point between each device.

In another implementation, a user may use primary device 169 and secondary device 170 to view a single video across multiple touch displays such as primary touch display 174 and secondary touch display 175. For example, a user may wish to extend the view port of a single device to expand the addressable region of one touch display to view single video content across multiple screens. As noted previously, the generated transform from the alignment process may subsequently be used to maintain the view as devices are rotated in relation to a reference point in the original alignment configuration.

Figure 2:
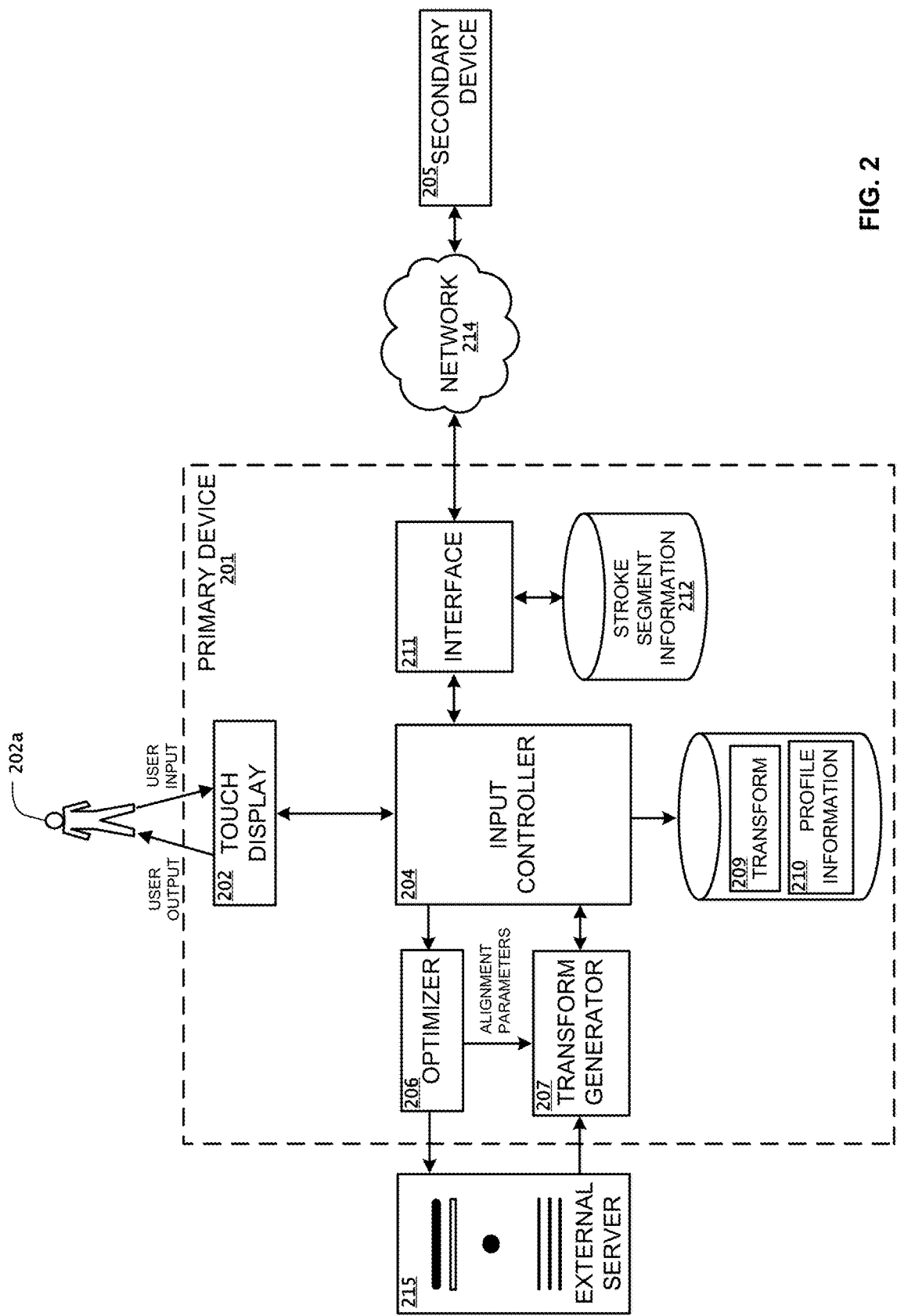
FIG. 2 is a diagram of an example system that may be used to perform alignment between multiple devices.

FIG. 2 is a diagram of an example system that may be used to perform alignment between multiple devices. Briefly, primary device 201 includes a touch display 202 that receives user stroke segment input from user 202*a*, input controller 204 that processes user input from the touch display 202 and input transmitted from secondary device 205, optimizer 206 that receives user stroke segment input from input controller 204 and creates an offset between primary device 201 and secondary device 205 using certain alignment parameters, transform generator 207 that determines the transform 209 between primary device 201 and secondary device 205 and associates the transform with profile information 210, and interface 211 that is used to transmit information data to input and output among other things between primary device 201 and secondary device 205 and store stroke segment information 212 for primary device 201 and secondary device 205. Network 214 is used to establish a connection between primary device 201 and secondary device 205.

The alignment process begins when a user provides a stroke input into touch display 202 of primary device 201. The input may be delivered directly through the use of a finger or through the use of a device capable to transmitting input to the touch display such as a digitizer or stylus.

User stroke segment input is transmitted from the touch display to input controller 204. Input controller 204 may associate the input with information from primary device 201 such as device ID and user ID and stores them as profile information 210 within a computer-readable medium within primary device 201. Additionally, input controller 204 transmits the user stroke segment input to optimizer 206 to calculate alignment parameters such as horizontal offset, vertical offset and rotational angle. Input controller 204 also transmits instructions via interface 211 to secondary device 205 to create a secondary alignment user interface.

In one implementation, the user stroke segment input data may be coordinate pixel locations of the user's touch points on touch display 202 which is then transmitted to the input controller as integer values. For example, coordinate pixel locations may be determined from the pixel map of the touch display as specified within the device specification. In another implementation, the user stroke segment input data may also be image files transmitted to the input controller with stoke paths drawn onto a touch display palate. For example, the image may be generated by the electrical signal path on the touch display after a designated time lapse.

In one implementation, input controller 204 may process and store the user stroke segment input from touch display 202 sequentially. For example, the input controller may initially transmit the user stroke segment input to the optimizer prior to storing it in a computer-readable medium with associated profile information. In another implementation, the input controller 204 may also process and store the user stroke segment input in parallel to reduce processing time in subsequent input processing and calculation steps in optimizer 206 and transform generator 207.

Input controller 204 transmits instructions to interface 211 to establish a connection with secondary device 205. In one implementation, the instruction may consist of processing steps to the operating system of the secondary device to perform a set of functions such as enabling the touch display of 205 to accept touch user input. In another implementation, the instruction may include displaying a text message on the touch display of secondary device 205 to confirm that a connection between primary device 201 and secondary device 205 has been established.

Input controller 204 transmits user stroke segment input from both primary device 201 and secondary device 205 to optimizer 206, which then determines a set of alignment parameters such as horizontal offset, vertical offset and rotation angle between the touch displays of the two devices.

The alignment parameters are transmitted from optimizer 206 to transform generator 207 to generate a transform 209 for secondary device 205.

In some implementations, calculations for the optimization and transform generation process may take place on an external server 215, which receives the user stroke segment input from the input controller 204 through any form of established connection such as a network connection. For example, external server 215 may be remotely connected to primary device 101 on the same network and receives the user stroke input through a wireless network connection. After the necessary calculations have been performed, the external server 215 may transmit the alignment parameters and the transform 209 back to input control, which processes and stores the transform into a computer-readable storage medium.

Transform generator 207 determines the transform based on the alignment parameters and the user stroke segment input from secondary device 205. Transform generator transmits the transform 209 to input controller 204, which stores the generated transform in a computer readable medium within primary device 201.

In some implementations, the transform may be used to develop a complementary view port of two individual touch displays showing a single graphical representation. For example, touch display 202 may show the side perspective of a three-dimensional object whereas touch display on secondary device 205 may show the top perspective of a three-dimensional object. In other implementations, the transform of primary device 201 and secondary device 205 may be used to form a common view port of touch display 202 to display one graphical representation across multiple touch displays. For example, a user may use the touch display of secondary device 205 as an extended display of touch display 202 by dragging a picture file displayed on touch display 202 into the touch display of secondary device 205 to display elements of the same picture across both touch display.

In other implementations, the transform may be used to coordinate user activities or computing processes on primary device 201 and secondary device 205 that are communicated to the user using the device's touch displays. Further, the transform between touch displays may be used to determine optimal location of the touch displays based on the stroke segment input supplied by the user in different setup configurations. For example, a user may wish to place the multiple displays perpendicular to one another, and use different touch configurations to generate multiple transforms to determine the optimal placement of secondary touch display in relation to touch display 202.

In other implementations, the transform may be used to detect time-dependent inputs between multiple devices and create a set of instructions or commands between devices. For example, a user may use the transform to track input provided on primary device 201 to execute a command on secondary device 205 after a specified time delay between the input on touch display 202 and output sent to the secondary touch display. Another example may include using the transform to detect a specified input to output a set of actions such as running an application, configuring the device and/or turning features of the operating system on or off.

In other implementations, the transform may be used as an input/output threshold to specify or direct different sets of actions on secondary devices based on the characteristics of the input provided on touch display 202. For example, the transform may be used to generate a pixel map where only certain locations within the touch display 202 trigger output actions to secondary device 205. A user may direct the primary device 201 to carry out a different set of procedures or actions based on the location of the input provided on touch display 202.

FIG. 3A is a flow chart illustrating an example process for dynamically configuring multiple displays. Briefly, the process 300A includes determining that a first mobile computing device is associated with a second mobile computing device; automatically determining positional information of the first mobile computing device in relation to the second mobile computing device, based at least on determining that the first mobile computing device is associated with the second mobile computing device; in response to determining positional information of the first mobile computing device in relation to the second mobile computing device, generating a transform between a first proximity sensitive display of the first mobile computing device and a second proximity sensitive display of the second mobile computing device; and using the transform to dynamically merge the viewports of the first proximity sensitive display and the second proximity sensitive display.

In further detail, when the process 300A begins, an association between a first mobile computing device and a second mobile computing device is determined (301). For example, the mobile computing devices, for example, may be a smartphone or a tablet computer. The association may be any type of wired or wireless communication protocol allows the exchange of information, such as a wide area network (WAN), a personal area network (PAN), or a local area network (LAN).

The positional information of the first mobile computing device in relation to the second mobile computing device is automatically determined based on the association between the devices (302). For example, the positional information may include the displacement between the two devices, including a horizontal and vertical displacement, or a rotation angle between the primary axes of each device.

In response to determining the positional information, a transform between a first touch displays of the first mobile computing device in relation to a second touch display of the second mobile computing device is determined (303). For example, the transform may represent a numerical expression that maps the displays of the two touch displays.

The transform is used to dynamically merge the viewports of the first touch display and the second touch display (304). For example, the transform of the two touch displays may be used to generate a shared coordinate system that merges the viewports of the two touch displays.

FIG. 3B is a flow chart illustrating an example process 300B for aligning screens of multiple touch displays. Briefly, The process 300B includes providing, for output by a first mobile computing device that (i) has a first proximity sensitive display and (ii) has been designated a primary display device, a primary alignment user interface; transmitting, by the first mobile computing device to a second mobile computing device that (i) has a second proximity sensitive display and (ii) has been designated a secondary display device, an instruction to output a secondary alignment user interface; transmitting, by the first mobile computing device to a second mobile computing device that (i) has a second proximity sensitive display and (ii) has been designated a secondary display device, an instruction to output a secondary alignment user interface; receiving, by the first mobile computing device, (i) data indicative of one or more stroke segments input through the primary alignment user interface that is output on the first proximity sensitive display of the first mobile computing device, and, (ii) from the second mobile computing device, data indicative of one or more stroke segments input through the secondary alignment user interface that is output on the second proximity sensitive display of the second mobile computing device; determining, based at least on the (i) data indicative of the one or more stroke segments input through the primary alignment user interface, and, (ii) data, received from the second mobile computing device, indicative of the one or more stroke segments input through the secondary alignment user interface, one or more display alignment parameters for the second proximity sensitive display, where the display alignment parameters for the second proximity sensitive display indicate an offset of the second proximity sensitive display in relation to the first proximity sensitive display; determining, based at least on the display alignment parameters for the second proximity sensitive display, a transform for the second proximity sensitive display; and using the transform for the second proximity sensitive display to process (i) a subsequently received input received through the second proximity sensitive display, or (ii) a subsequent output for display on the second proximity sensitive display.

In further detail, when the process 300B begins, a primary alignment user interface is provided for output by a first mobile computing device that (i) has a touch display and (ii) is designated a primary display device to a second mobile computing device. The mobile computing devices, for example, may be a smartphone or a tablet computer (311).

In some implementations, the first mobile computing device may be a different type of mobile computing devices from the second mobile computing device. For example, the first mobile computing device may be a smartphone and the second mobile computing device may be a tablet computer.

The primary alignment user interface may be a graphical user interface, a web-based user interface, a gesture interface, or any other type of interface that accepts an input from a user. In some implementations, the primary alignment user interface is outputted from the first mobile computing device to more than one mobile computing device. For example, a tablet computer may output a primary alignment user interface to multiple smartphones connected to the same network connection.

The mobile computing device that is designated the primary display device transmits an instruction to the secondary display device to output a secondary alignment user interface (312).

In some implementations where there are multiple secondary display devices, the primary display device may send different instructions to the secondary display devices. For example, a smartphone designed as the primary display device may output a graphical user interface through a mobile application to a secondary display device that is a smartphone, and a web-based graphical user interface to a secondary device that is a tablet computer.

In some implementations, the primary display device may transmit instructions sequentially to multiple secondary display devices once the user provides input on the secondary alignment user interface. For example, a primary display device may initially transmit an instruction to a smartphone and then submit a second instruction to a second smartphone once the user has provided an input to the first secondary alignment user interface. In other implementations, the primary display device may transmit instructions to multiple secondary display devices in parallel to lower the transmission time between the devices.

The primary mobile computing device receives input user stroke segment input on the primary touch display through the primary alignment user interface, and user stroke segment input to the secondary display device through the secondary alignment user interface, which outputs the input stroke segment data to the primary alignment user interface (313). In some implementations, the primary alignment user interface may receive outputs from multiple secondary alignment user interfaces. In other implementations, the primary alignment user interface may be a different type of user interface than the secondary alignment user interface. For example, a smartphone with a primary alignment user interface that is a touch user interface may receive output from another smartphone with a secondary alignment user interface that is a hardware user interface that provides output to the primary alignment user interface with the push of a physical button.

The primary mobile computing device determines the offset of the secondary touch display in relation to the primary touch display using at least one more alignment parameters of the user stroke segment input through the primary alignment user interface and the output of the user stroke segment input to the secondary display device, through the secondary alignment user interface, respectively (314).

In some implementations, the alignment parameters may be a displacement in input stroke segments on the primary and secondary touch displays using a reference coordinate system of the primary touch display. For example, if the primary and secondary touch displays are located beside one another, the offset may be the horizontal displacement of the input stroke segments on each touch display in relation to a reference point on the primary touch display such as the top-left pixel.

In some implementations, the primary and secondary touch displays may be of different sizes. For example, if the primary device is a smartphone and the secondary device is a tablet, then the alignment parameters between the input strokes segments provided on both devices will be determined based on the touch display of the smartphone. In other implementations, the screen resolutions of the two touch displays may differ.

In other implementations, the alignment parameters may be represented by other types of directional and rotational displacement, or a combination of the two. For example, if the vertical or horizontal planes of the secondary touch display are not perpendicular to the horizontal or vertical planes of the primary touch display, the alignment parameters will be determined to be a vertical and horizontal displacement as well as a rotational angle between the reference coordinate on the primary touch display and the input stroke segment coordinates on the secondary touch display.

The primary mobile computing device determines the transform for the secondary touch display in relation to the primary touch display based at least on the display parameters for the secondary touch display (315).

The primary mobile computing device uses the transform for the secondary touch displays to process a received user stroke input or an output on the secondary touch sensitive display (316).

In some implementations, the primary mobile device may use the transform to create a shared coordinate system between the primary and secondary touch displays to create a single view port. For example, if a user inputs a continuous stroke segment from a primary mobile computing devices that is a smartphone to a secondary mobile computing device that is a tablet computer, than the smartphone may use the transform of the input stroke segment on the touch display of the tablet computer to map the input coordinates in reference to the coordinate system of the smartphone.

Figure 4:
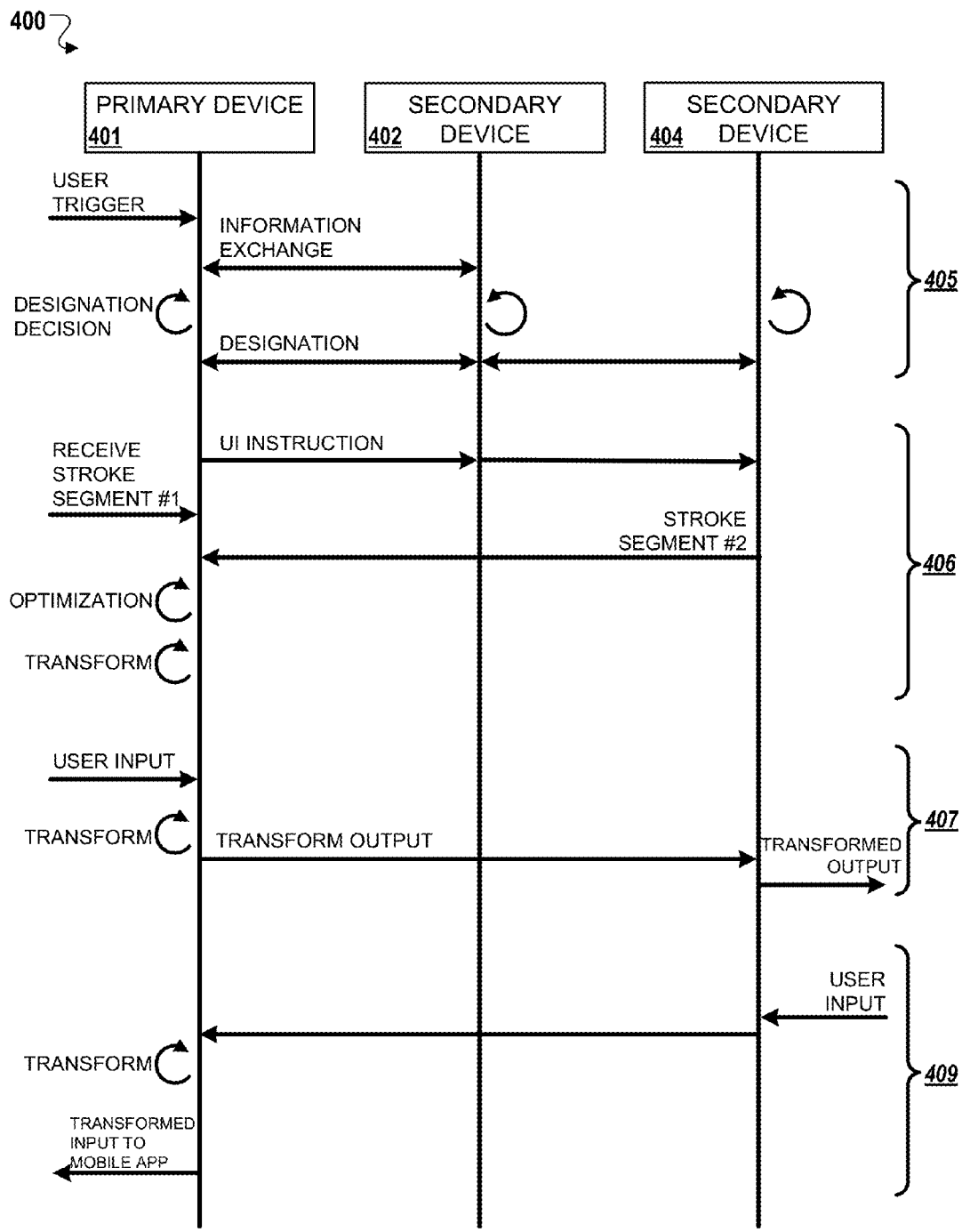
FIG. 4 is a swim lane diagram of an example alignment process.

FIG. 4 illustrates how multiple devices may send and receive stroke segment input through the alignment process. Alignment process 400 includes primary device 401, secondary device 402, and secondary device 404, but may include more secondary devices are represented in FIG. 4. Communication between all devices throughout the alignment process includes the designation phase (405), the optimization phase (406), the transformation phase (407), and the input/output process phase (409).

The designation phase (405) starts with a user trigger to primary device such as a input on the touch display of primary device 401, which subsequently initiates an exchange of information between primary device 401, secondary device 402, secondary device 404, and any other device with touch display that may be in proximity of the primary device. This information exchange may be communicated by a network medium through an operating system or through a common mobile application between all devices. After a common connection has been established between all devices, a designation decision is transmitted from primary device 401 to all secondary devices such as secondary device 402 and secondary device 404 to identify the device where subsequent alignment processes will take place.

The optimization phase (406) begins by providing a primary alignment user interface on the primary device 401 for output to all secondary devices such as secondary device 402 and secondary device 404. Primary device transmits a user interface instruction to secondary device 402 and secondary device 404 to output secondary alignment user interfaces. Subsequently, a user is directed to provide an input stroke segment onto the touch display of primary device 401, which is then provided to the input controller. The user continues with subsequent stroke segment input onto all secondary devices, which is transmitted back to the primary device through the alignment user interfaces via a network medium. The input controller of primary device 401 receives stroke segment information from secondary devices such as secondary device 404, which is then optimizes to determine an offset between the stroke segments on touch displays of primary device 401 and secondary device 404. The coordinates of the input stroke segments are then transmitted to the transform generator to generate a transform between the display coordinates of the input stroke segments on primary device 401 and secondary device 404, respectively.

The transformation phase (407) initiates with a user input on the touch display of primary device 401 after alignment parameters have been determined in the optimization phase (406). The transform calculated in previous stage is applied to the user input and transmitted to secondary devices such as secondary device 404 through the alignment user interface. Subsequently, secondary device 404 receives the transformed output, which represents the user input on primary device 401 with the transform applied.

The input/output process phase (409) initiates with a user input on secondary device 404 that is transmitted back to primary device 401 through the secondary alignment user interface. A transform is applied to user input from secondary device 404 to calculate the mapped coordinates on the touch display of primary device 401.

Transformed input may be outputted to complete the storage process. In one implementation, the transformed input may be outputted to a mobile application on primary device 401 that performs a set of actions that indicate a successful alignment. For example, the transformed input may create a trigger to open a text notification on the touch display of the primary device indicating that alignment has completed.

In another implementation, transformed input may also be outputted to designate a failed alignment attempt when the transformed input does not meet a certain criteria. For example, if the transform is complete, then the transformed input may have insufficient values that may be analyzed through a post-processing data filter to determine whether the transform was successful. The insufficient transformed input may subsequently be used to output a failure text notification to a mobile application.

In other implementations, the transformed input may be outputted to an operating system of either one or more of the devices to initiate a coordinated activity between the primary device and all of the secondary devices. For example, after successful alignment process, the transformed input may be used to automatically initiate a user activity that utilizes concurrent use of all touch displays of the devices into one view port such as playing a game or watching a video. In another implementation, the transformed input may be outputted to a shared mobile application such as a video conferencing app to synchronize the devices after successful alignment.

Figure 5:
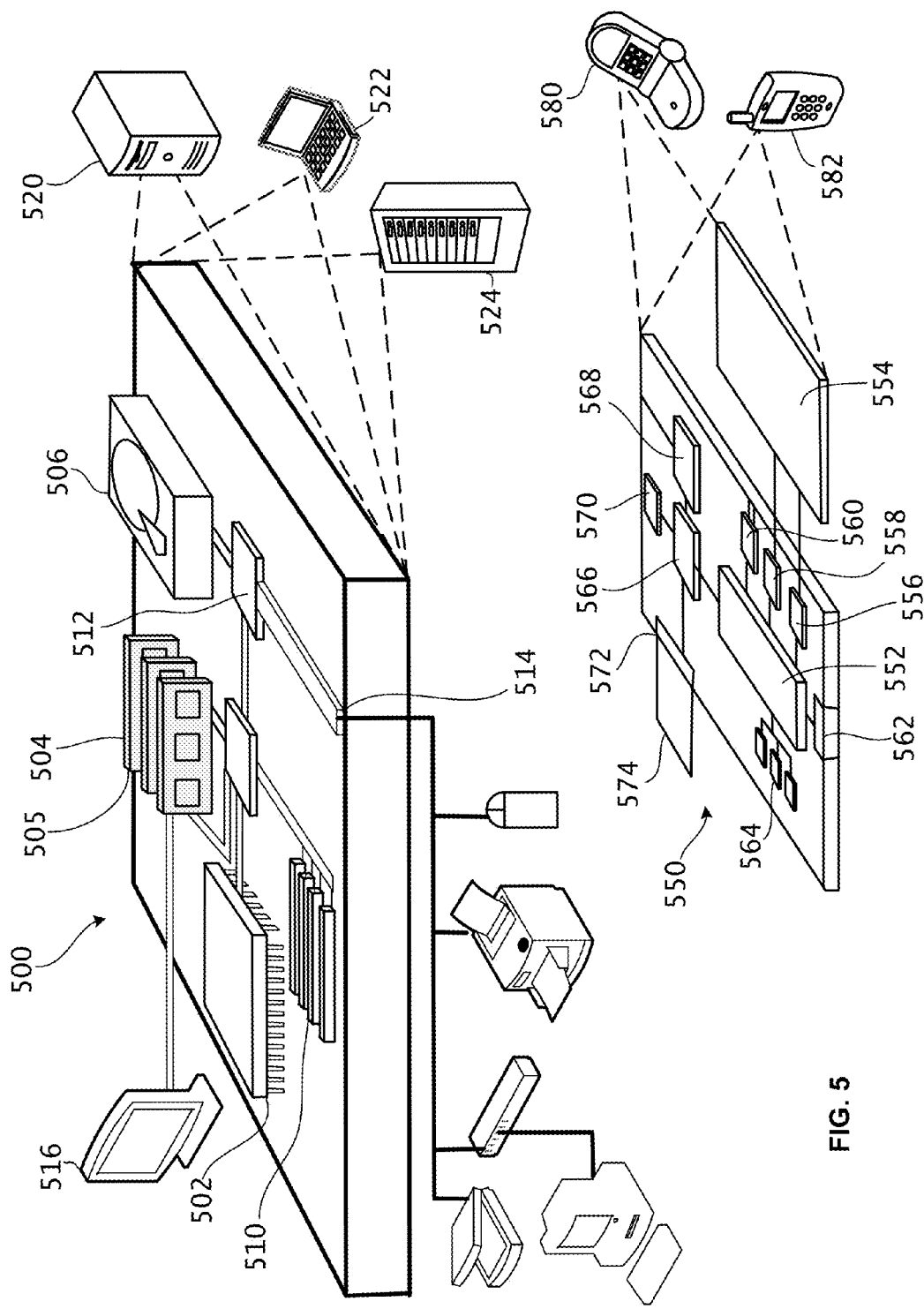
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, microphone/speaker pair, a scanner, or a networking device such as a switch or router, e.g., through a network adapter. The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:

determining that a first mobile computing device that has a first proximity sensitive display with first screen resolution characteristics is associated with a second mobile computing device that has a second proximity sensitive display with different, second screen resolution characteristics;

obtaining touch data indicating multiple user inputs, the multiple user inputs including at least (i) a first stroke segment input along a first axis that continues from a portion of the first proximity sensitive display to a portion of the second proximity sensitive display, and (ii) a second stroke segment input along a second axis that continues from a different portion of the first proximity sensitive display to a different portion of the second proximity sensitive display, the first axis intersecting with the second axis at an intersection point between the first proximity sensitive display and the second proximity sensitive display;

determining, based on the obtained touch data, one or more differences between the first resolution characteristics of the first proximity sensitive display of the first mobile computing device and the second screen resolution characteristics of the second proximity sensitive display of the second mobile computing devices, in response to determining that the first mobile computing device is associated with the second mobile computing device, automatically determining, based on the first stroke segment input and the second stroke segment input indicated by the obtained touch data, positional information of the first mobile computing device in relation to the second mobile computing device;

in response to automatically determining the positional information of the first mobile computing device in relation to the second mobile computing device, generating, using the touch data, a transform that accounts for the determined one or more differences between the first screen resolution characteristics of the first proximity sensitive display of the first mobile computing device and the second screen resolution characteristics of the second proximity sensitive display of the second mobile computing device; and using the transform to dynamically merge the viewports of the first proximity sensitive display and the second proximity sensitive display despite the one or more differences between the first screen resolution characteristics of the first proximity sensitive display of the first mobile computing device and the second screen resolution characteristics of the second proximity sensitive display of the second mobile computing device.

2. The method of claim 1, comprising:

providing, for output by the first mobile computing device that (i) has a first proximity sensitive display and (ii) has been designated a primary display device, a primary alignment user interface;

transmitting, by the first mobile computing device to the second mobile computing device that (i) has a second proximity sensitive display and (ii) has been designated a secondary display device, an instruction to output a secondary alignment user interface;

receiving, by the first mobile computing device, (i) data indicative of one or more stroke segments input through the primary alignment user interface that is output on the first proximity sensitive display of the first mobile computing device, and, (ii) from the second mobile computing device, data indicative of one or more stroke segments input through the secondary alignment user interface that is output on the second proximity sensitive display of the second mobile computing device;

determining, based at least on the (i) data indicative of the one or more stroke segments input through the primary alignment user interface, and, (ii) data, received from the second mobile computing device, indicative of the one or more stroke segments input through the secondary alignment user interface, one or more display alignment parameters for the second proximity sensitive display, wherein the display alignment parameters for the second proximity sensitive display indicate an offset of the second proximity sensitive display in relation to the first proximity sensitive display;

determining, based at least on the display alignment parameters for the second proximity sensitive display, a transform for the second proximity sensitive display; and using the transform for the second proximity sensitive display to process (i) a subsequently received input received through the second proximity sensitive display, or (ii) a subsequent output for display on the second proximity sensitive display.

3. The method of claim 2, wherein the alignment parameters comprise (i) a horizontal offset in relation to a reference point on the primary display device, (ii) a vertical offset in relation to a reference point on the primary display device, and (iii) an angular offset in relation to an axis associated with the primary display device.

4. The method of claim 2, wherein using the transform for the second proximity sensitive display comprises:

receiving, by the first mobile computing device and from the second mobile computing device, data indicative of the subsequently received input received through the second proximity sensitive display;

applying, by the first mobile computing device, the data indicative of the subsequently received input to the transform to generate a transformed input; and providing the transformed input to an application executing on the first mobile computing device.

5. The method of claim 2, wherein using the transform for the second proximity sensitive display comprises:

receiving, by the first mobile computing device, data indicative of the subsequent output from an application executing on the first mobile computing device;

providing, by the first mobile computing device, a transformed output to the second mobile computing device.

6. The method of claim 2, comprising:

obtaining, by the first mobile computing device, data that characterizes the first mobile computing device;

receiving, by the first mobile computing device, data that characterizes the second mobile computing device; and based at least on the (i) data that characterizes the first mobile computing device, and (ii) the data that characterizes the second mobile computing device, designates the first mobile computing device as the primary display device.

7. The method of claim 2, comprising:

after using the transform for the second proximity sensitive display, determining that the offset of the second proximity sensitive display in relation to the first proximity sensitive display has likely changed;

in response to determining that the offset of the second proximity sensitive display in relation to the first proximity sensitive display has likely changed, providing, for output by the first mobile computing device, the primary alignment user interface;

transmitting, by the first mobile computing device to the second mobile computing device, a second instruction to output the secondary alignment user interface;

receiving, by the first mobile computing device, (i) data indicative of one or more additional stroke segments input through the primary alignment user interface that is output on the first proximity sensitive display of the first mobile computing device, and, (ii) from the second mobile computing device, data indicative of one or more additional stroke segments input through the secondary alignment user interface that is output on the second proximity sensitive display of the second mobile computing device;

determining, based at least on the (i) data indicative of the one or more additional stroke segments input through the primary alignment user interface, and, (ii) data, received from the second mobile computing device, indicative of the one or more additional stroke segments input through the secondary alignment user interface, one or more subsequent display alignment parameters for the second proximity sensitive display;

determining, based at least on the subsequent display alignment parameters for the second proximity sensitive display, a second transform for the second proximity sensitive display; and using the second transform for the second proximity sensitive display to process (i) a further received input received through the second proximity sensitive display, or (ii) a further output for display on the second proximity sensitive display.

8. The method of claim 2, wherein display alignment parameters are determined further based on (iii) a slope of one or more of the stroke segments input through the primary alignment user interface or the secondary alignment user interface, (iv) an identifier of a user of the first mobile computing device or the second mobile computing device, (v) timing information relating to input of one or more of the stroke segments input through the primary alignment user interface or the secondary alignment user interface, (vi) model information of the first mobile computing device or the second mobile computing device, or (vii) one or more characteristics of the first proximity sensitive display or the second proximity sensitive display.

9. A non-transitory computer-readable storage device encoded with a computer program, the program comprising instructions that when executed by a data processing apparatus cause the data processing apparatus to perform operations comprising:
   determining that a first mobile computing device that has a first proximity sensitive display with first screen resolution characteristics is associated with a second mobile computing device that has a second proximity sensitive display with different, second screen resolution characteristics;
   obtaining touch data indicating multiple user inputs, the multiple user inputs including at least (i) a first stroke segment input along a first axis that continues from a portion of the first proximity sensitive display to a portion of the second proximity sensitive display, and (ii) a second stroke segment input along a second axis that continues from a different portion of the first proximity sensitive display to a different portion of the second proximity sensitive display, the first axis intersecting with the second axis at an intersection point between the first proximity sensitive display and the second proximity sensitive display;
   determining, based on the obtained touch data, one or more differences between the first resolution characteristics of the first proximity sensitive display of the first mobile computing device and the second screen resolution characteristics of the second proximity sensitive display of the second mobile computing devices,
   in response to determining that the first mobile computing device is associated with the second mobile computing device, automatically determining, based on the first stroke segment input and the second stroke segment input indicated by the obtained touch data, positional information of the first mobile computing device in relation to the second mobile computing device;
   in response to automatically determining the positional information of the first mobile computing device in relation to the second mobile computing device, generating, using the touch data, a transform that accounts for the determined one or more differences between the first screen resolution characteristics of the first proximity sensitive display of the first mobile computing device and the second screen resolution characteristics of the second proximity sensitive display of the second mobile computing device; and
   using the transform to dynamically merge the viewports of the first proximity sensitive display and the second proximity sensitive display despite the one or more differences between the first screen resolution characteristics of the first proximity sensitive display of the first mobile computing device and the second screen resolution characteristics of the second proximity sensitive display of the second mobile computing device.

10. The computer-readable storage device of claim 9, comprising:
    providing, for output by the first mobile computing device that (i) has a first proximity sensitive display and (ii) has been designated a primary display device, a primary alignment user interface;
    transmitting, by the first mobile computing device to the second mobile computing device that (i) has a second proximity sensitive display and (ii) has been designated a secondary display device, an instruction to output a secondary alignment user interface;
    receiving, by the first mobile computing device, (i) data indicative of one or more stroke segments input through the primary alignment user interface that is output on the first proximity sensitive display of the first mobile computing device, and, (ii) from the second mobile computing device, data indicative of one or more stroke segments input through the secondary alignment user interface that is output on the second proximity sensitive display of the second mobile computing device;
    determining, based at least on the (i) data indicative of the one or more stroke segments input through the primary alignment user interface, and, (ii) data, received from the second mobile computing device, indicative of the one or more stroke segments input through the secondary alignment user interface, one or more display alignment parameters for the second proximity sensitive display, wherein the display alignment parameters for the second proximity sensitive display indicate an offset of the second proximity sensitive display in relation to the first proximity sensitive display;
    determining, based at least on the display alignment parameters for the second proximity sensitive display, a transform for the second proximity sensitive display; and
    using the transform for the second proximity sensitive display to process (i) a subsequently received input received through the second proximity sensitive display, or (ii) a subsequent output for display on the second proximity sensitive display.

11. The computer-readable storage device of claim 10, wherein the alignment parameters comprise (i) a horizontal offset in relation to a reference point on the primary display device, (ii) a vertical offset in relation to a reference point on the primary display device, and (iii) an angular offset in relation to an axis associated with the primary display device.

12. The computer-readable storage device of claim 10, wherein using the transform for the second proximity sensitive display comprises:
    receiving, by the first mobile computing device and from the second mobile computing device, data indicative of the subsequently received input received through the second proximity sensitive display;
    applying, by the first mobile computing device, the data indicative of the subsequently received input to the transform to generate a transformed input; and
    providing the transformed input to an application executing on the first mobile computing device.

13. The computer-readable storage device of claim 10, wherein using the transform for the second proximity sensitive display comprises:
    receiving, by the first mobile computing device, data indicative of the subsequent output from an application executing on the first mobile computing device;
    applying, by the first mobile computing device, the data indicative of the subsequent output to the transform to generate a transformed output;

providing, by the first mobile computing device, the transformed output to the second mobile computing device.

14. The computer-readable storage device of claim 10, comprising:
    obtaining, by the first mobile computing device, data that characterizes the first mobile computing device;
    receiving, by the first mobile computing device, data that characterizes the second mobile computing device; and
    based at least on the (i) data that characterizes the first mobile computing device, and (ii) the data that characterizes the second mobile computing device, designates the first mobile computing device as the primary display device.

15. The computer-readable storage device of claim 10, comprising:
    after using the transform for the second proximity sensitive display, determining that the offset of the second proximity sensitive display in relation to the first proximity sensitive display has likely changed;
    in response to determining that the offset of the second proximity sensitive display in relation to the first proximity sensitive display has likely changed, providing, for output by the first mobile computing device, the primary alignment user interface;
    transmitting, by the first mobile computing device to the second mobile computing device, a second instruction to output the secondary alignment user interface;
    receiving, by the first mobile computing device, (i) data indicative of one or more additional stroke segments input through the primary alignment user interface that is output on the first proximity sensitive display of the first mobile computing device, and, (ii) from the second mobile computing device, data indicative of one or more additional stroke segments input through the secondary alignment user interface that is output on the second proximity sensitive display of the second mobile computing device;
    determining, based at least on the (i) data indicative of the one or more additional stroke segments input through the primary alignment user interface, and, (ii) data, received from the second mobile computing device, indicative of the one or more additional stroke segments input through the secondary alignment user interface, one or more subsequent display alignment parameters for the second proximity sensitive display;
    determining, based at least on the subsequent display alignment parameters for the second proximity sensitive display, a second transform for the second proximity sensitive display; and
    using the second transform for the second proximity sensitive display to process (i) a further received input received through the second proximity sensitive display, or (ii) a further output for display on the second proximity sensitive display.

16. The computer-readable storage device of claim 10, wherein display alignment parameters are determined further based on (iii) a slope of one or more of the stroke segments input through the primary alignment user interface or the secondary alignment user interface, (iv) an identifier of a user of the first mobile computing device or the second mobile computing device, (v) timing information relating to input of one or more of the stroke segments input through the primary alignment user interface or the secondary alignment user interface, (vi) model information of the first mobile computing device or the second mobile computing device, or (vii) one or more characteristics of the first proximity sensitive display or the second proximity sensitive display.

17. A system comprising:
    one or more computers and one or more storage devices storing instructions that are operable, when executed by the one or more computers, to cause the one or more computers to perform operations comprising:
    determining that a first mobile computing device that has a first proximity sensitive display with first screen resolution characteristics is associated with a second mobile computing device that has a second proximity sensitive display with different, second screen resolution characteristics;
    obtaining touch data indicating multiple user inputs, the multiple user inputs including at least (i) a first stroke segment input along a first axis that continues from a portion of the first proximity sensitive display to a portion of the second proximity sensitive display, and (ii) a second stroke segment input along a second axis that continues from a different portion of the first proximity sensitive display to a different portion of the second proximity sensitive display, the first axis intersecting with the second axis at an intersection point between the first proximity sensitive display and the second proximity sensitive display;
    determining, based on the obtained touch data, one or more differences between the first resolution characteristics of the first proximity sensitive display of the first mobile computing device and the second screen resolution characteristics of the second proximity sensitive display of the second mobile computing devices,
    in response to determining that the first mobile computing device is associated with the second mobile computing device, automatically determining, based on the first stroke segment input and the second stroke segment input indicated by the obtained touch data, positional information of the first mobile computing device in relation to the second mobile computing device;
    in response to automatically determining the positional information of the first mobile computing device in relation to the second mobile computing device, generating, using the touch data, a transform that accounts for the determined one or more differences between the first screen resolution characteristics of the first proximity sensitive display of the first mobile computing device and the second screen resolution characteristics of the second proximity sensitive display of the second mobile computing device; and
    using the transform to dynamically merge the viewports of the first proximity sensitive display and the second proximity sensitive display despite the one or more differences between the first screen resolution characteristics of the first proximity sensitive display of the first mobile computing device and the second screen resolution characteristics of the second proximity sensitive display of the second mobile computing device.

18. The system of claim 17, comprising:
    providing, for output by a first mobile computing device that (i) has a first proximity sensitive display and (ii) has been designated a primary display device, a primary alignment user interface;

transmitting, by the first mobile computing device to a second mobile computing device that (i) has a second proximity sensitive display and (ii) has been designated a secondary display device, an instruction to output a secondary alignment user interface;

receiving, by the first mobile computing device, (i) data indicative of one or more stroke segments input through the primary alignment user interface that is output on the first proximity sensitive display of the first mobile computing device, and, (ii) from the second mobile computing device, data indicative of one or more stroke segments input through the secondary alignment user interface that is output on the second proximity sensitive display of the second mobile computing device;

determining, based at least on the (i) data indicative of the one or more stroke segments input through the primary alignment user interface, and, (ii) data, received from the second mobile computing device, indicative of the one or more stroke segments input through the secondary alignment user interface, one or more display alignment parameters for the second proximity sensitive display, wherein the display alignment parameters for the second proximity sensitive display indicate an offset of the second proximity sensitive display in relation to the first proximity sensitive display;

determining, based at least on the display alignment parameters for the second proximity sensitive display, a transform for the second proximity sensitive display; and using the transform for the second proximity sensitive display to process (i) a subsequently received input received through the second proximity sensitive display, or (ii) a subsequent output for display on the second proximity sensitive display.

19. The system of claim 18, wherein using the transform for the second proximity sensitive display comprises:
receiving, by the first mobile computing device and from the second mobile computing device, data indicative of the subsequently received input received through the second proximity sensitive display;
applying, by the first mobile computing device, the data indicative of the subsequently received input to the transform to generate a transformed input; and
providing the transformed input to an application executing on the first mobile computing device.

20. The system of claim 18, wherein using the transform for the second proximity sensitive display comprises:
receiving, by the first mobile computing device, data indicative of the subsequent output from an application executing on the first mobile computing device;
applying, by the first mobile computing device, the data indicative of the subsequent output to the transform to generate a transformed output;
providing, by the first mobile computing device, the transformed output to the second mobile computing device.

* * * * *